United States Patent [19]

Takano et al.

[11] Patent Number: 4,642,080
[45] Date of Patent: Feb. 10, 1987

[54] POWER TRANSMISSION BELT

[75] Inventors: Hiroshi Takano; Shinichi Takagi; Kiyokazu Wada, all of Hyogo, Japan

[73] Assignee: Mitsuboshi Belting Ltd., Kobe, Japan

[21] Appl. No.: 697,445

[22] Filed: Feb. 1, 1985

[51] Int. Cl.[4] ............................................... F16G 1/21
[52] U.S. Cl. ............................ 474/244; 305/35 EB; 428/224; 428/295; 428/492; 428/902; 474/261; 474/263; 474/266
[58] Field of Search ................ 428/224, 292, 293, 294, 428/295, 902, 492; 474/242, 244, 266, 261, 263, 271, 267; 305/35 R, 35 EB, 38, 54

[56] References Cited

U.S. PATENT DOCUMENTS

| 1,664,335 | 3/1928 | Todd | 474/244 |
| 2,182,461 | 12/1939 | Yeakel | 74/237 |
| 3,673,883 | 7/1972 | Adams | 474/205 |
| 3,800,611 | 4/1974 | Rogers | 474/264 |
| 4,305,714 | 12/1981 | Renshaw | 474/250 |
| 4,365,965 | 12/1982 | Russ | 474/244 |

FOREIGN PATENT DOCUMENTS 1137003 1/1957 France ........................ 474/242

Primary Examiner—James J. Bell
Attorney, Agent, or Firm—Wood, Dalton, Phillips, Mason & Rowe

[57] ABSTRACT

A power transmission belt for transmitting high loads having an elastomeric looped flat belt portion having a longitudinally extending tensile cord and defining an outer surface and an inner surface, and a plurality of longitudinally extending spaced blocks mounted to the outer and inner surfaces respectively of the flat belt portion. Each block is formed of a core and a fabric wrapped around the core. In one embodiment, the block is secured to the flat belt portion by bolts extending therethrough. The fabric of the blocks may be treated with different materials, such as rubber, synthetic resins, and the like. The core may be formed of an elastomeric material. The flat belt portion may be provided with one or more layers of fabric.

39 Claims, 6 Drawing Figures

POWER TRANSMISSION BELT

DESCRIPTION

TECHNICAL FIELD

This invention relates to power transmission belts, and in particular to power transmission belts adapted for carrying high loads.

BACKGROUND OF THE INVENTION

In one form of known power transmission belt adapted for transmitting high loads, an endless steel band is provided with a plurality of V-shaped metal blocks. Examples of such constructions are shown in U.S. Pat. Nos. 3,949,621, 4,303,403, and 4,342,561. As shown therein, each block is mounted to the steel band and includes a projection and recess on one side of the head surface. The blocks are longitudinally spaced and are arranged in face-to-face abutting relationship to the steel band.

Such power transmission belts, while providing for high load transmission, have not proven completely satisfactory in the art because of the substantial weight thereof. Further, such belts generate high levels of noise requiring sound deadening means, such as oil baths and the like.

In U.S. Pat No. 4,365,965, a V-block belt is shown having a flat belt portion formed of a polymeric resin and having V-blocks mounted thereto formed of polymeric resin. As disclosed therein, the belt construction is extremely complicated and expensive.

In U.S. Pat No. 4,305,714, a heavy duty power transmission belt is shown to be formed of a lamination of rubber impregnated fabric on a lower surface portion of a cushion rubber layer so as to provide cog projections on the inner surface of the belt for engagement with a drive pulley. While this belt construction provides improved flexibility, it has a decreased ability to transmit high loads as a result of the intrusion into the pulley of the cushion rubber material which is conventionally of relatively high resiliency. Another attempt to resolve this vexatious problem has been the employment of metal rods or pipes or wooden elements in the cogged portion of the belt. Such materials are disadvantageous in that wood is relatively weak and, when heated, the synthetic resin strength characteristics decrease. Such heating normally occurs from the engagement of the belt with the pulley in the drive operation. Thus, such belts have been found to present serious problems in the reduction in strength and wear resistance.

In one form of the belt, the cogged portion is formed of aluminum in an effort to reduce the weight. Aluminum, however, has been found to present disadvantages in the low wear resistance thereof.

More recently, still another form of power transmission belt adapted for high load transmission has been developed, as illustrated in FIG. 3 of the drawing hereof. As shown therein, the prior art belt includes a tensile cord midportion, an outer reinforcing plate portion, and an inner trapezoidal block portion. Bolts are extended through the belt to secure the plate and block portions to the tensile cord portion.

In Japanese Utility Model Application No. 48727/1983, a cogged block structure for use in such a belt is disclosed as being formed of a cloth wrapped in a spiral and impregnated with either rubber of thermosetting resin. By wrapping the cloth or fabric spirally, a more rigid block is provided compared with a block formed of a plurality of flat laminated fabric layers. Such a block, however, has been found to have the vexatious problem of high noise generation. If the rigidity of the block is decreased to suppress the noise, its transmitting force has been found to be adversely decreased. The prior art belts of this configuration have had the disadvantages of relatively high weight and cost and inconvenience in handling.

SUMMARY OF THE INVENTION

The present invention comprehends an improved power transmission belt adapted for transmitting high loads wherein a plurality of longitudinally spaced cogs are mounted to the inner surface of a looped flat belt portion. A tensile cord extends longitudinally through the flat belt portion. Each of the blocks is formed of a core and a treated fabric wrapped around the core.

In one form, the fabric comprises rubberized fabric. In another form, the fabric is subjected to a synthetic resin, such as a thermosetting resin.

In the illustrated embodiment, the cogged blocks are secured to the flat belt portion by bolts extended therethrough.

In the illustrated embodiment, a plate may be provided on the outer surface of the flat belt portion for distributing the anchoring load to the flat belt portion.

The flat belt portion may be provided with one or more layers of fabric in addition to the tensile cord and the fabric may be disposed outwardly of the tensile cord, inwardly of the tensile cord, or both inwardly and outwardly thereof.

The cross section of the cogged blocks may be varied and, in the illustrated embodiment, is generally of trapezoidal configuration. The corners of the blocks adjacent the inner surface of the flat belt portion may be rounded or angular, as desired.

The core of the blocks may be formed of selected materials and may be provided with reinforcing short fibers, as desired.

Each of the fabric and core may be formed of different preselected materials in accordance with the invention.

Illustratively, the fabric may be formed of woven cloth consisting of cotton, synthetic, carbon, glass, and metal fibers. The synthetic fibers illustratively may comprise polyester or nylon fibers.

The core may have any suitable cross-sectional configuration and, in the illustrated embodiments, is shown to comprise selectively circular or rectangular cross-sectional configurations.

Any suitable rubber compound may be utilized within the scope of the invention, including chloroprene, Hypalon, epichlorhydrine, natural rubber, SBR, urethane rubber, etc.

The rubber may be applied in the form of a paste by being spread on the cloth or by being wiped with a cloth by a friction method. Other impregnating methods may be utilized in effecting the desired coating of the fabric fibers.

The invention comprehends the inclusion of a lubricant in the thermosetting resin of which the core may be formed. It is desirable that the core have a relatively low friction factor, such as in the range of 0.1 to 0.7. It is further desirable that the core have a relatively low specific gravity so as to minimize the weight thereof.

Examples of thermosetting material used in the core include phenol resins, epoxy resins, polyamide resins, and unsaturated polyester resins. Where cut fibers or fabric are provided in reinforcing the core, they may be formed of any suitable material, such as cotton fibers, synthetic fibers, glass fibers, carbon fibers, and metallic fibers.

The fabric wrapped about the core may be in any desired form, including woven fabric, and may be formed of cotton fibers, synthetic resin fibers, such as polyester or nylon fibers, carbon fibers, glass fibers, and metallic fibers. The thermosetting resin of the fabric may be any suitable resin including phenol resin, epoxy resin, polyamide resin, and unsaturated polyester rein.

The trapezoidal configuration of the blocks may be effected by molding the blocks in that configuration after winding the fabric thereabout.

The core material and the cloth impregnating material may be similar or dissimilar, as desired. Illustratively, where the materials are dissimilar, the core material may be formed of a material having a low rigidity factor, such as a rubber compound having 98§ of hardness and the material with which the cloth is impregnated comprising a rubber compound having a 96§ hardness (9JIS A).

Where a dual cogged construction is desired, the blocks may be provided on both the inner and outer surfaces of the belt, although, in the illustrated embodiments, the blocks are shown only on the inner surface.

The use of the novel core-wrapped block construction provides for high rigidity of the cogged blocks, improved facility and low cost in manufacture of the belt, low noise generation by selection of the desired core material, and controlled frictional characteristics of the block for improved power drive transmission.

Thus, the belt construction of the present invention is extremely simple and economical while yet providing the highly desirable features discussed above.

BRIEF DESCRIPTION OF THE DRAWING

Other features and advantages of the invention will be apparent from the following description taken in connection with the accompanying drawing wherein:

FIG. 4 is a fragmentary longitudinal section of a power transmission belt embodying the invention utilizing the block configuration of FIG. 2a;

BEST MODE FOR CARRYING OUT THE INVENTION

Figure 1:
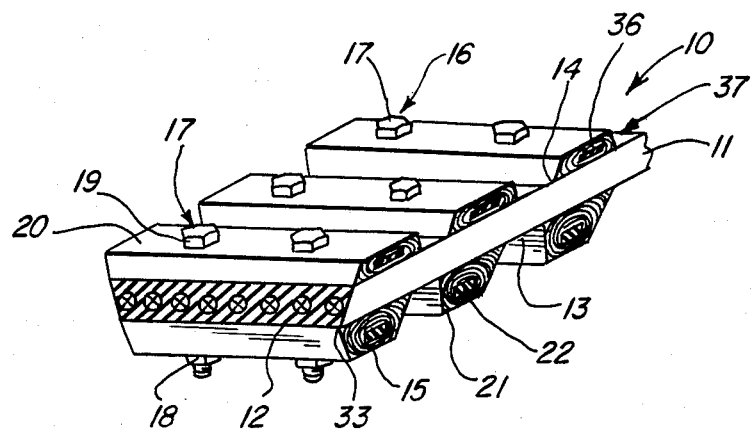
FIG. 1 is a fragmentary perspective view of a power transmission belt embodying the invention.

In the illustrative embodiment of the invention as disclosed in the drawing, a power transmission belt embodying the invention is illustrated in FIG. 1 to comprise a belt generally designated 10 including a flat belt portion 11, provided with a plurality of longitudinally extending tensile cords 12. The flat belt portion defines an inner surface 13 and an outer surface 14. A plurality of longitudinally spaced cog blocks 15 are mounted to the inner surface 13.

As seen in FIG. 1, the blocks are secured to the flat belt portion by nut and bolt means 16 including bolts 17 and nuts 18. The bolts include head portions 19. The bolts extend through outer anchor plates 20, the flat belt portion 11, and the blocks 15, with the heads 19 of the bolts engaging the anchor plates 20 and the nuts 18 engaging the undersurface of the blocks 15, as seen in FIG. 1. In the illustrated embodiment, two such bolt means are provided in association with each of the blocks.

The invention comprehends the forming of the blocks by the spiral wrapping of a fabric layer 21 about a core 22.

Figure 2A:
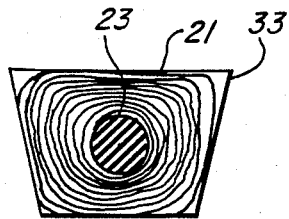
FIG. 2a is a transverse section of a block adapted for use in the power transmission belt hereof.
Figure 2B:
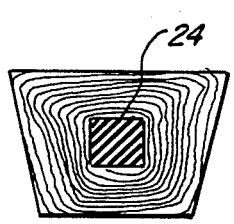
FIG. 2b is a transverse section of a modified form of such block.

The core may have any suitable cross-sectional configuration, and as shown in FIG. 2a, the core 23 may have a circular cross section. As shown in FIG. 2b, the core 24 may have a rectangular cross section, and more specifically, as illustrated therein, may have a square cross section.

Figure 2C:
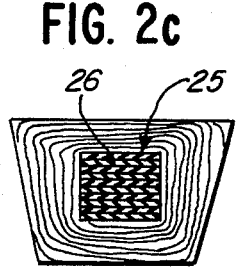
FIG. 2c is a transverse cross section of still another modified form of such block.
Figure 3:
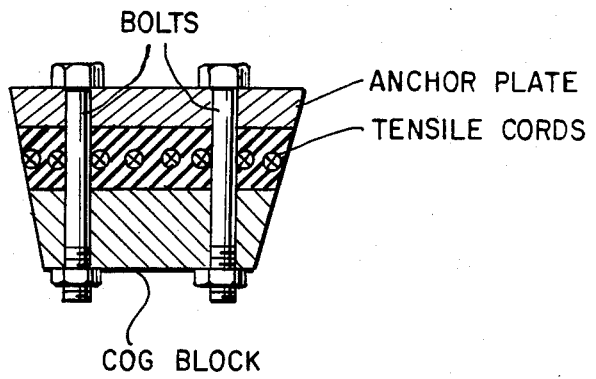
FIG. 3 is a transverse section of a belt construction of the prior art.

The core may be formed of a single material, as illustrated in FIGS. 2a and 2b, or may comprise a built-up construction generally designated 25, as illustrated in FIG. 2c. As shown in FIG. 2c, the built-up construction 25 may be formed of a plurality of laminations 26. As will be obvious to those skilled in the art, the core alternatively may be built up by spirally wrapping a fabric.

In transverse cross section, the power transmission belt may have a V-shaped configuration, as illustrated in FIG. 1.

The flat belt portion 11 may be formed of an elastomeric material, such as rubber. Thus, the flat belt portion may be formed of one or more of natural rubber, styrene-butadiene rubber, chloroprene rubber, nitrile rubber, butyl rubber, and polyethylene chlorosulfanate (Hypalon) rubber. Further, the core may be formed of polyurethane rubber. Where the core is formed of a fabric, the fabric may comprise nylon cloth or Kevlar cloth. The cloth may comprise a bias cloth of warp cotton yarns or wide angle cloth.

The tensile cords may comprise conventional material, such as polyester, fatty polyamides, aromatic polyamides, glass, twisted wires, etc., as desired, to provide the high strength, low elongation characteristics desired.

If desired, a shrinkable cloth formed of crimped nylon warp or wooly finish cloth, in combination with nylon wefts, may be provided on the lower surface of the flat belt portion for improved retention of the blocks to the flat belt portion.

In the embodiment of FIG. 1, the anchor plates 20 may comprise blocks formed generally in the same manner as blocks 15 in that the anchor plates may include a core portion 36 and a fabric portion 37 wrapped about the core portion. Thus, in the embodiment of FIG. 1, the outer blocks 20 may be utilized in providing a drive from the outer surface portion of the flat belt portion.

In the embodiment of FIG. 1, the upper and lower blocks are shown to have somewhat different configurations, it being understood that the blocks may be identical in cross-sectional configuration and construction, or different, as desired, within the scope of the invention.

As discussed above, the blocks are arranged so as to determine a generally trapezoidal cross-sectional configuration by the suitable wrapping of the fabric about the core.

Where the core is formed of an elastomeric material, it may be formed of a molded rubber. The fabric may be impregnated with similar rubber compound or may be impregnated with a different material, as desired.

As discussed above, the use of nuts and bolts as the anchoring means in mounting the blocks to the flat belt portion is exemplary. As will be obvious to those skilled in the art, other suitable means, such as rivets, may be utilized. Additionally, spring washers and/or conventional flat washers may be utilized in locking the threaded securing means, as well as for purposes of distributing the anchoring load.

The use of the improved block structures permits facilitated mounting thereof to the flat belt portion, while yet the blocks may be readily replaced as for maintenance purposes. The improved block construction, however, minimizes fatigue of the rubber layer between the blocks and the tensile cords. The blocks may be constructed to provide improved side pressure resistance and, as discussed above, to minimize noise generation while yet providing for transmission of high loads.

Figure 4:
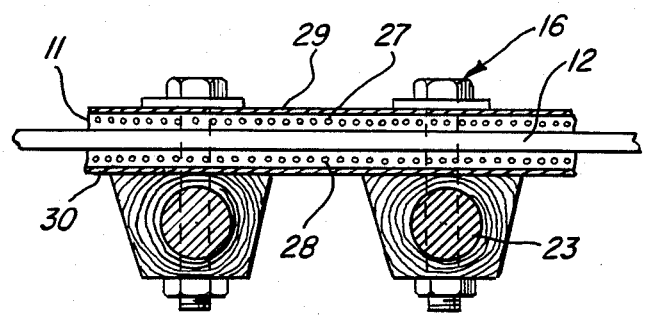

As indicated above, the flat belt portion may be further provided with one or more fabric layers. Such fabric layers may be provided outwardly of the tensile cord, inwardly thereof, or both outwardly and inwardly, as shown in FIG. 4, wherein a fabric layer 27 is provided outwardly of the tensile cord 12, and a fabric layer 28 is provided inwardly thereof.

Still further, the flat belt portion may be provided with an outer covering fabric 29 and an inner covering fabric 30, as seen in FIG. 1. The use of the covering fabric may be in lieu of or in conjunction with the use of the fabric layers 27 and/or 28.

Experiments were conducted utilizing different block materials. The test belt had a rope circumference length of 750 mm, a belt top width of 32 mm, a belt height of 15 mm, a block pitch of 11.5 mm, a belt angle of 26°, a flat belt height of 4 mm, and 17 tensile cords. The dimension of the block in cross section was 7 mm, a top side width of 10 mm, and a bottom side width of 7 mm.

The block had a trapezoidal cross section with a height of 4 mm, a bottom side width of 10 mm, and a top side width of 8 mm.

In the belt running test, the belt was engaged with two pulleys having a diameter of 70 mm.

The test was run with the driving pulley operating at a speed of 5000 r.p.m., at no load, and at an ambient temperature of 20°-25° C. At the running speed (5000 r.p.m.), the belt tension was 80-120 kilograms.

The test was conducted as follows: the block sample was set on two supports having a 60 mm spacing. A weight (w) was applied to the center of the sample. The bending strain (e) was measured. The bending elastic modulus was determined by the following equation:

$E = wl_3/48eI$ ($I$ = secondary moment). The sound pressure was measured by a microphone spaced one meter from the running test apparatus.

The result of the rigidity ratio and sound pressure tests are shown below. The rigidity ratio was obtained by setting the bending elastic modulus to one.

| No. | Material of Block | Rigidity Ratio | Sound Pressure |
|---|---|---|---|
| 1 | Rubber only | 1 | 87 |
| 2 | 2-ply rubber-coated glass cloth wound around a rubber core | 3. | 88 |
| 3 | 5 plies of rubber-coated glass cloth wound around a rubber core | 4.8 | 91 |
| 4 | Rubber-coated glass cloth spirally wound, only | 5.2 | 95 |

Belts of Nos. 2 and 3, as indicated above, have slightly increased sound pressure, but at a slightly increased rate of increase of the sound pressure as compared to the increase in rigidity, thus being similar to the use of only rubber as the block material.

The No. 4 belt rigidity is large, but has a disadvantageously raised sound pressure.

Thus, the invention comprehends the mounting of trapezoidal section blocks of wrapped core construction at accurately spaced pitch intervals on the inner surface of the flat belt portion. The side pressure resistance and rigidity of the belt is substantially increased by the utilization of this construction, thereby greatly improving the durability of the belt as well as additional desirable characteristics.

Thus, the invention contemplates that the fabric may be wrapped around the core material as a shaft construction, thereby facilitating shaping to the desired block configuration.

By suitable selection of the fabric and impregnating material, a low frictional coefficient can be readily obtained.

At the same time, low noise generation may be provided as desired by suitably selecting the core material.

By suitably selecting the core material and configuration, control of the overall rigidity of the belt is readily obtained. The bending elastic modulus of the belt is substantially improved, such as in a ratio of 5 to 1, where the spiral wrapped fabric is utilized over the use of a laminated block construction.

By permitting the use of relatively inexpensive materials in the core, the cost of the belt may be substantially reduced. Further, as indicated above, the core material may comprise a material having relatively low density so that the weight of the belt is further reduced.

The fabric may be impregnated not only with rubber but also with thermosetting resin, as indicated above. The laminated fabric illustrated in FIG. 2c may be impregnated with thermosetting resin, also as desired. Thus, illustratively, the core fabric may be impregnated with the same thermosetting resin as employed in the fabrics spirally wrapped about the core, if desired.

It has been found that the use of the thermosetting resin impregnated cloth provides improved side pressure resistance and rigidity, together with substantially improved durability of the belt.

The use of glass cloth impregnated laminate in the core, such as illustrated in FIG. 2c, provides improved frictional coefficient of the block.

The thermosetting resin may be mixed with lubricant so as to further decrease the coefficient of friction of the block. It has been found possible to control the frictional coefficient of the block to lie in the range of approximately 0.1 to 0.7 quite easily in this manner.

Illustratively, where glass fiber cloth is utilized impregnated with epoxy resin and the cloth was laminated in parallel, an elastic modulus of the block of 2,150 kg/mm$_2$ was obtained. Where the cloth was spirally wound, the modulus of elasticity increased to 3,250 kg/mm$_2$.

Where the glass fiber cloth laminate impregnated with epoxy resin was utilized as the core material and the outer cloth spirally wound around the core material, a modulus of elasticity of 3,015 kg/mm$_2$ was obtained.

The core material may comprise a mixture of thermosetting resin and rubber compound so as to further suppress the noise generation.

As shown in FIG. 4, the flat belt portion 11 includes the fabric layers 27 and 28. The flat belt may be formed of a suitable elastomeric material, such as rubber blends of NR, SBR, CR, NBR, IIR, Hypalon, or polyurethane rubber. The cords of the fabrics 27 and 28 may be arranged to extend primarily perpendicularly to the longitudinal extent of the flat belt portion. The cord fabric may be formed of suitable materials, such as polyamide, aromatic polyamide, polyester, glass, etc.

The covering fabric 29 may be applied in one or more layers and may comprise nylon cloth, Kevlar cloth, bias cloth made of warp cotton yarns, or wide angle cloth. The covering layers are laminated and bonded to the outer and inner surfaces in the conventional manner.

The tensile cords may be formed of suitable material having high strength and low elongation, such as polyester, polyamide, aromatic polyamide, or glass fibers, or twisted wires.

The fabrics 27 and 28 serve as means for preventing migration of the bolt means during use of the belt.

Figure 5:
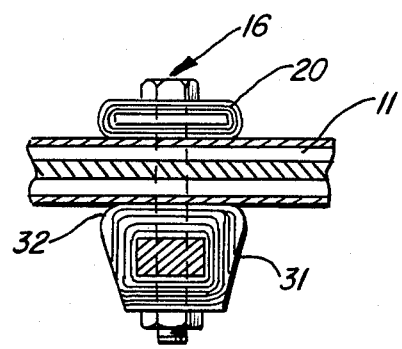
FIG. 5 is a fragmentary longitudinal section of another form of power transmission belt embodying the invention utilizing a block construction as shown in FIG. 2b, and a modified form of anchor plate on the outer surface of the flat belt portion.

Still another embodiment of the belt is illustrated in FIG. 5 wherein the block 31 is provided with rounded corners 32 in lieu of the angular corners 33 of the blocks 15 adjacent the inner surface 13 of the flat belt portion 11. The use of the rounded corners provide for further improved flexibility in the belt.

Figure 6:
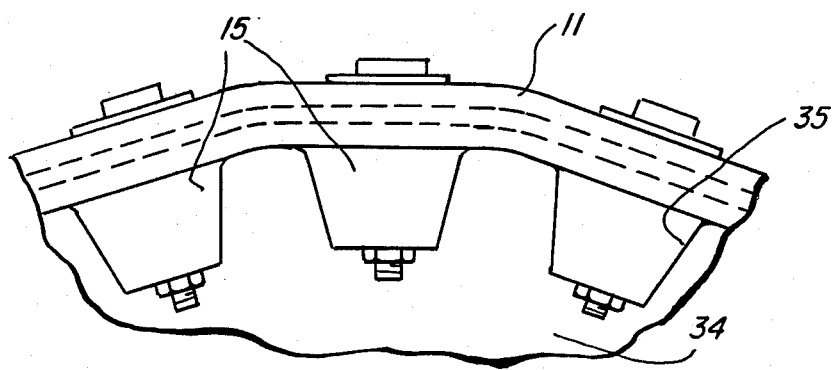
FIG. 6 is a fragmentary side elevation illustrating the coaction between the power transmission belt of the present invention and a V-pulley providing a high load transmission power drive.

As seen in FIG. 6, the belt provides a unique cooperation with the drive pulley 34 in that the flexing of the flat belt portion occurs between the blocks 15 received in the pulley grooves 35. Thus, as seen in FIG. 6, the belt assumes a somewhat polygonal extension configuration in passing around the pulleys. This has been found to minimize fatigue of the tensile cords and, thus, provide further improved long troublefree life of the belt construction.

Thus, the invention broadly comprehends an improved high load transmitting belt construction wherein cogged blocks are mounted to the flat belt portion by suitable securing means and wherein the cogged blocks are formed of a core about which a treated fabric is wrapped to define a generally trapezoidal cross section.

The cross section of the belt also is generally trapezoidal in forming a V-belt configuration. The unique construction of the blocks provides for improved control of the friction, wear, and strength characteristics thereof so as to provide an improved long, troublefree life of the power transmission belt notwithstanding the use thereof in applications requiring high load transmission.

We claim:

1. A power transmission belt for transmitting high loads, said belt comprising:
   an elastomeric flat belt portion defining an outer surface and an inner surface;
   a tensile cord extending longitudinally in said flat belt portion;
   a plurality of pairs of aligned longitudinally, equally spaced first and second blocks adjacent said outer and inner surfaces respectively of the flat belt portion, each block comprising a core and fabric wrapped around said core; and
   securing means extending through said flat belt portion and the cores of the aligned blocks for removably securing said aligned blocks to said outer and inner surfaces, said blocks of the aligned pairs mutually defining anchor plates for each other.

2. The power transmission belt of claim 1 wherein said fabric is impregnated with rubber.

3. The power transmission belt of claim 1 wherein said fabric comprises a cloth having a wiping of rubber material on the surface thereof.

4. The power transmission belt of claim 1 wherein said fabric is spirally wrapped about said core.

5. The power transmission belt of claim 1 wherein said fabric comprises a cloth having rubber material coated on the surface thereof.

6. The power transmission belt of claim 1 wherein said fabric is rubberized with urethane rubber.

7. The power transmission belt of claim 1 wherein said fabric is formed of fibers selected from the group consisting of cotton, synthetics, glass, carbon, and metal.

8. The power transmission belt of claim 1 wherein said core is formed of an elastomeric material.

9. The power transmission belt of claim 1 wherein said core is formed of rubber.

10. The power transmission belt of claim 1 wherein said core is formed of rubber with short fibers distributed therein.

11. The power transmission belt of claim 1 wherein said core is formed of rubber with short fibers distributed therein and extending lengthwise perpendicular to the longitudinal extent of the belt.

12. The power transmission belt of claim 1 wherein said core is formed of urethane rubber.

13. The power transmission belt of claim 1 wherein said core has a circular cross section.

14. The power transmission belt of claim 1 wherein said core has a rectangular cross section.

15. The power transmission belt of claim 1 wherein said core has a square cross section.

16. The power transmission belt of claim 1 wherein said blocks are generally trapezoidal in cross section.

17. A power transmission belt for transmitting high loads, said belt comprising:
    an elastomeric flat belt portion defining an outer surface and an inner surface;
    a tensile cord extending longitudinally in said flat belt portion;
    a plurality of pairs of aligned longitudinally, equally spaced first and second blocks adjacent said outer and inner surfaces respectively of the flat belt portion, each block comprising a core and fabric with a synthetic resin applied thereto; and
    securing means extending through said flat belt portion and the cores of the aligned blocks for removably securing said aligned blocks to said outer and inner surfaces, said blocks of the aligned pairs manually defining anchor plates for each other.

18. The power transmission belt of claim 17 wherein said resin comprises a resin selected from the group consisting of phenol resin, epoxy resin, polyamide resin and unsaturated polyester resin.

19. The power transmission belt of claim 17 wherein said fabric is formed of fiber selected from the group consisting of cotton, synthetics, glass, carbon and metal.

20. The power transmission belt of claim 17 wherein said core is formed of a material selected from the group consisting of thermosetting resin, thermosetting resin in which cut fiber is dispersed, thermosetting resin in which rubber compound is mixed, and laminated cloth impregnated with thermosetting resin.

21. The power transmission belt of claim 17 wherein said core is provided with a distribution of short fibers therein.

22. The power transmission belt of claim 17 wherein said core is provided with a distribution of short fibers therein selected from the group consisting of cotton, synthetics, glass, carbon, and metal.

23. The power transmission belt of claim 17 wherein said flat belt portion includes fabric embedded therein.

24. The power transmission belt of claim 17 wherein said flat belt portion includes fabric embedded therein, said fabric being similar to the fabric wrapped about said core.

25. The power transmission belt of claim 17 wherein said flat belt portion includes fabric embedded therein comprising a layer of fabric outwardly of the tensile cords.

26. The power transmission belt of claim 17 wherein said flat belt portion includes fabric embedded therein comprising a layer of fabric inwardly of the tensile cords.

27. The power transmission belt of claim 17 wherein said flat belt portion includes fabric embedded therein comprising a first layer of fabric outwardly of the tensile cords and a second layer of fabric inwardly of the tensile cords.

28. The power transmission belt of claim 17 wherein said core is formed of a material selected from the group consisting of thermosetting resin, thermosetting resin in which cut fiber is dispersed, thermosetting resin in which rubber compound is mixed, and laminated cloth impregnated with thermosetting resin, said cut fiber comprising fiber selected from the group consisting of cotton, synthetics, glass, carbon, and metal.

29. The power transmission belt of claim 1 wherein said flat belt portion includes fabric embedded therein.

30. The power transmission belt of claim 1 wherein said flat belt portion includes fabric embedded therein similar to said fabric wrapped around said core.

31. The power transmission belt of claim 1 wherein said flat belt portion includes fabric embedded therein both outwardly of and inwardly of said tensile cord.

32. The power transmission belt of claim 1 wherein said blocks define rounded corners adjacent said flat belt portion.

33. The power transmission belt of claim 17 wherein said blocks define rounded corners adjacent said flat belt portion.

34. The power transmission belt of claim 1 wherein said blocks define angular corners adjacent said flat belt portion.

35. The power transmission belt of claim 17 wherein said blocks define angular corners adjacent said flat belt portion.

36. The power transmission belt of claim 17 wherein said blocks are generally trapezoidal in cross section.

37. The power transmission belt of claim 1 wherein said securing means comprises bolts extending through said flat belt portion.

38. The power transmission belt of claim 1 wherein said securing means comprises bolts extending through said flat belt portion perpendicularly to the flat extent of said flat belt portion.

39. The power transmission belt of claim 1 wherein said securing means comprises bolts extending through said flat belt portion and including an anchoring plate on the outer surface of the flat belt portion.

* * * * *